Aug. 28, 1934.  H. I. LEA  1,971,492
STILL AND EVAPORATION APPARATUS
Filed Oct. 10, 1932  3 Sheets-Sheet 1

Inventor
Henry I. Lea
Attorney

Aug. 28, 1934.  H. I. LEA  1,971,492

STILL AND EVAPORATION APPARATUS

Filed Oct. 10, 1932  3 Sheets-Sheet 3

Inventor
Henry I. Lea

Attorney.

Patented Aug. 28, 1934

1,971,492

UNITED STATES PATENT OFFICE 1,971,492

STILL AND EVAPORATION APPARATUS

Henry I. Lea, Santa Monica, Calif.

Application October 10, 1932, Serial No. 637,067

26 Claims. (Cl. 202—180)

This invention has reference to apparatus of the class including stills, boilers and distillation equipment, and in certain of its aspects deals with improvements in the type of apparatus comprising the subject matter of Patent No. 1,845,159, issued Feb. 16, 1932, to me on Distillation system, and my improvement Patent No. 1,889,254 granted November 29, 1932, on Still.

The principal objects of the invention are directed to the provision of an improved evaporator or boiler, so designed as to operate at extremely high thermal efficiency and vapor generating capacity. In accordance with the invention, I have provided an evaporator wherein liquid to be subjected to heating and vaporization, is passed through a vertically progressing series of horizontally extending channels or troughs. Preferably, the troughs are so arranged as to conduct the liquid in a downward substantially spiral path about a central heating chamber. I preferably, though not necessarily, utilize hot combustion gases as the heating medium, the hot gases being passed upwardly through the heating chamber surrounded by the troughs, and in direct and extended surface contact with the latter. The shape and arrangement of the troughs are such that the liquid is caused to flow in a continuous path at fairly high velocity, and in a shallow stream having a relatively very large evaporating surface. The troughs themselves are so formed as to provide a large area of thin metallic walls in direct contact with the combustion zone, the particular shape of the troughs being such that extremely high rate of heat transmission to the liquid is possible. By virtue of a continuous flow of the liquid being maintained in a thin stream having large evaporating surface and large surface contact with the heating walls of the troughs, conditions are established for operation with highest thermal efficiency and vapor generating capacity.

Preferably, I provide in conjunction with my improved type of evaporator, a condenser so arranged as to surround the evaporator, the relative arrangements of the evaporator and condenser being similar to that described in my issued patent and pending application referred to above. Feed liquid is passed upwardly through the condenser to become preheated by vapors liberated from the evaporator, to the end that maximum thermal efficiency will be maintained in the system by recovery, as sensible heat in the feed liquid, of a large part of the heat expended in vaporizing the liquid in its course over the evaporator.

Another novel aspect of the invention resides in the provision of means whereby air and gases present in the preheated liquid being fed to the evaporator, may be freed under most favorable conditions from the liquid, to prevent contamination of the distillate and reduction in the efficiency of the operation of the evaporator. The invention contemplates various other advances and objects which, in addition to those mentioned above, will be explained to best advantage in the following detailed description of a typical form of apparatus embodying the invention.

Reference is had throughout the description to the accompanying drawings, in which:

Fig. 4 is a fragmentary enlarged sectional view on line 4—4 of Fig. 1;

Fig. 5 is a fragmentary enlarged section on line 5—5 of Fig. 2; and

Figure 1:
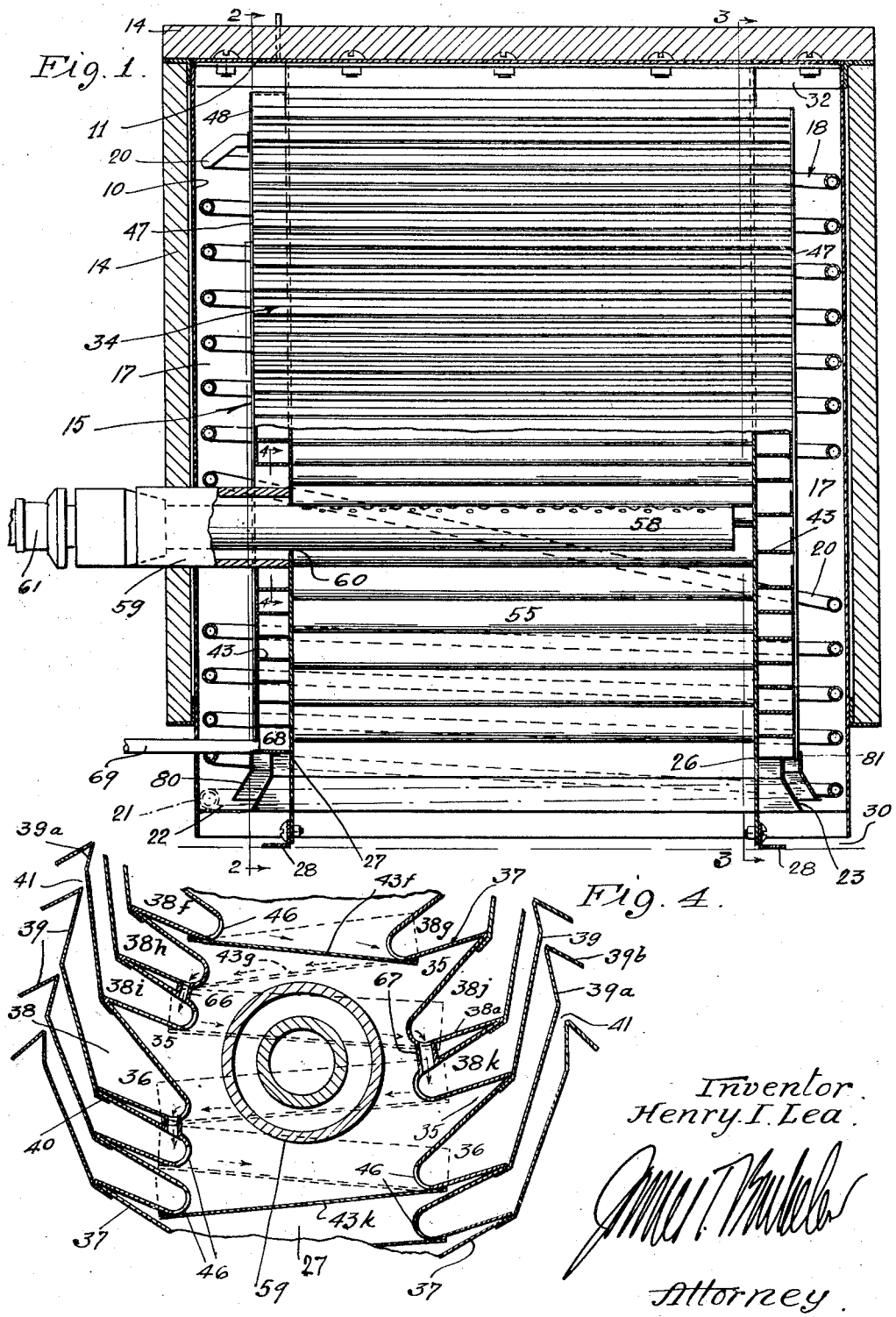
Fig. 1 is a longitudinal sectional view of the still taken on broken line 1—1 of Fig. 2.

The still which I have illustrated as a typical embodiment of my invention, is shown to comprise an outer shell 10, rectangular in horizontal section, and having a cover plate 11 carrying a peripheral angle section 12 which is secured to the shell flange 10a and to cover plate 11 by bolts 13. The shell and its cover are thermally insulated against the escape of heat from the interior of the structure, by suitable insulating material 14 applied in the manner indicated. An evaporator, generally indicated at 15, extends vertically within the shell and in spaced relation to the four walls thereof, the evaporator comprising, generally speaking, means whereby liquid supplied thereto at its upper end, is caused to flow downwardly to the bottom of the apparatus in an extended path of flow while being subjected to heating and vaporization, all in the manner hereinafter described. It will suffice to state at this point that as a result of the liquid becoming heated in its downward path of flow within the evaporator, vapors are liberated into the spaces at 16 between the evaporator and the side walls of the shell 10, and into spaces 17, see Fig. 1, (from side spaces 16 shown in Fig. 2) between the evaporator and the end walls of the shell.

The evaporator is surrounded by a condenser, indicated at 18, of a generally tubular arrangement, and positioned in spaced relation about the evaporator. It is to be understood that in the broad aspects of the invention, any suitable means may be employed for condensing the vapors liberated from the evaporator, although I preferably utilize a condenser extending substantially the full height of the evaporator, and positioned so as to surround the latter. The form of condenser herein illustrated comprises a rectangularly spiral coil of pipe 20 connecting with the feed water inlet 21 at the bottom of the still, and with the evaporator at its upper end, as will presently appear. Liquid to be distilled is passed from inlet 21 upwardly through the spiral coil, from whence it passes to the evaporator to be subjected to heat and vaporization in its extended downward flow over and through the evaporator.

As described in my issued patents hereinabove referred to, wherein generally similar evaporator and condenser arrangements are described, the condenser serves a two-fold purpose. First, the vapors liberated from the evaporator become condensed upon striking the condenser coils, the relation between the quantity of feed liquid passing through the condenser, and the proportion vaporized in the evaporator, being under such control that complete condensation of the vapors may be accomplished by the cooling capacity of the feed liquid alone. Through this control, the percentage of liquid distilled may be held at any point desired, up to that at which the waste liquid becomes a saturated solution. The second function of the condenser is to conserve the heat in the system, that is, the heat being put into the liquid in the evaporator. This is accomplished by transferring the greater portion of this heat, which appears as latent heat of vaporization in the vapors liberated from the evaporator to the feed liquid in the condenser, the heat reappearing upon condensation of the vapors, as sensible heat in the feed liquid. So efficient is the interchange of heat between the evaporator and condenser, that the feed liquid after passing through the condenser and upon reaching the upper end of the evaporator, may be preheated to substantially boiling temperature.

While, for purposes of describing my invention, I have shown the shell of the still to be generally rectangular in shape, and the evaporator also to be substantially rectangular in section, it is to be understood that in so doing I do not impliedly limit the invention in such respects. Broadly speaking, any suitable form of shell may be used, and the evaporator may be positioned therein in any suitable manner coming within the scope of the claims appended hereto.

The evaporator frame structure comprises a pair of vertically extending trough supporting plates 26 and 27, see Fig. 1, secured at their lower ends to transverse angle irons 28 which in turn are bolted at 29 to the side walls of the shell. The entire still structure is supported on these transverse angle irons 28, the bottom of the shell 10 being raised from the ground or floor level as at 30 in order to provide space through which air may be taken into the combustion chamber within the evaporator. The upper ends of plates 26 and 27 are secured to angle pieces 32 which are bolted to the underside of cover plate 11. A substantial supporting structure for the evaporator is thus provided by plates 26 and 27 being rigidly fixed at their upper and lower ends to the shell structure.

These plates 26 and 27 serve to directly support vertically progressing series of side troughs generally indicated at 34, the troughs at opposite sides of the supports being relatively vertically offset, as indicated. The edges of plates 26 and 27 are cut in conformity with the desired shape and arrangement of the side troughs, that is to say the supporting plates are cut in exaggerated saw tooth fashion to form inwardly inclined spaces between "teeth" to accommodate the troughs. Thus, referring to Fig. 4, the projecting or "tooth" portions of the supporting plates appear at 35, and the recesses into which the troughs extend, at 36.

Each vertical series of side troughs preferably is formed by a single sheet of metal, for example a thin sheet of copper, which is bent in conformity with the irregular edges of the supporting plates. The trough-forming metallic sheet 37 thus is bent about the projections 35 to form individual horizontally extending troughs 38 which open upwardly and outwardly from the interior of the evaporator. The bottoms 38a of the troughs preferably extend at an angle of about 15° with the horizontal, this angle of inclination being preferred by reason of the fact that it has been found to be most efficient in free and quiet liberation of vapor from water flowing over its surface.

A series of spaced, upwardly and outwardly extending vanes 39 are secured to the troughs at 40, the upper portion 39a of each vane being bent inwardly to form with the vane next above a somewhat constricted vapor passing space at 41. The upper ends 39b of the vanes are bent downwardly and outwardly as indicated. Preferably, both the troughs and the outwardly projecting vanes will be formed of copper sheeting, and their surfaces exposed to the liquid or vapors being distilled, that is the entire outer surface of the trough-forming sheet and the inner and top surface of the vanes, will be tinned to protect the copper against deleterious action of the liquid and to maintain purity of distillate.

Preferably, though not necessarily, the side troughs 38 will be substantially level, so as to increase the length of time required for the liquid to flow through the troughs, to the end that the liquid, although flowing in a stream, will remain subjected to heating and vaporization, over a desired period of time.

As shown in Fig. 1, the ends of the side troughs project beyond the vertical supporting plates 26 and 27. These projecting ends of the troughs are interconnected, as perhaps best shown in Figs. 2, 4 and 5, by a series of inclined end troughs so arranged that the liquid in flowing down through the evaporator, will follow a substantially spiral path of flow. Each end trough comprises an angular piece 43 placed directly beneath the inner vertically offset sides of a pair of oppositely positioned side troughs. The bottom portion 43a of each end trough may be soldered at 44 to the outer face of the vertical supporting plate 26 or 27, and also to the under surface of the side troughs which the end trough overlaps. The side or outer walls 43b overlap the projecting ends of the side troughs, and where the thickness of the trough metal is substantial, the ends of the side troughs may be notched to take walls 43b of the end troughs so that the outer surfaces of these walls and the ends of the side troughs, will lie in a single plane. As shown most clearly in Fig. 4, the end portions of the side troughs projecting beyond the supporting plates, are slotted at 46 to provide openings through which the liquid may flow from one side trough into the communicating end trough, and thence into the next lower side trough at the opposite side.

The ends of the side troughs are closed by vertically extending plates 47 which may be soldered to the ends of the trough-forming sheet metal and to the ends of vanes 39. By closing the troughs at their ends by means of plates 47, it will be seen that the vapors will be liberated only from the side troughs of the evaporator, through openings 41.

While if desired, the side troughs may be continued around the ends of the evaporator, instead of providing separate end troughs, and the trough given such slope as to cause the liquid to flow in a continuously inclined spiral path, I prefer the form of construction which I have illustrated, principally by reason of its structural advantages. It is found that the described end trough arrangement affords a convenient means for connecting the side troughs, a further advantage being gained in that by such arrangement, the side troughs may be substantially level and yet the desired downward spiral path of flow maintained.

Figure 2:
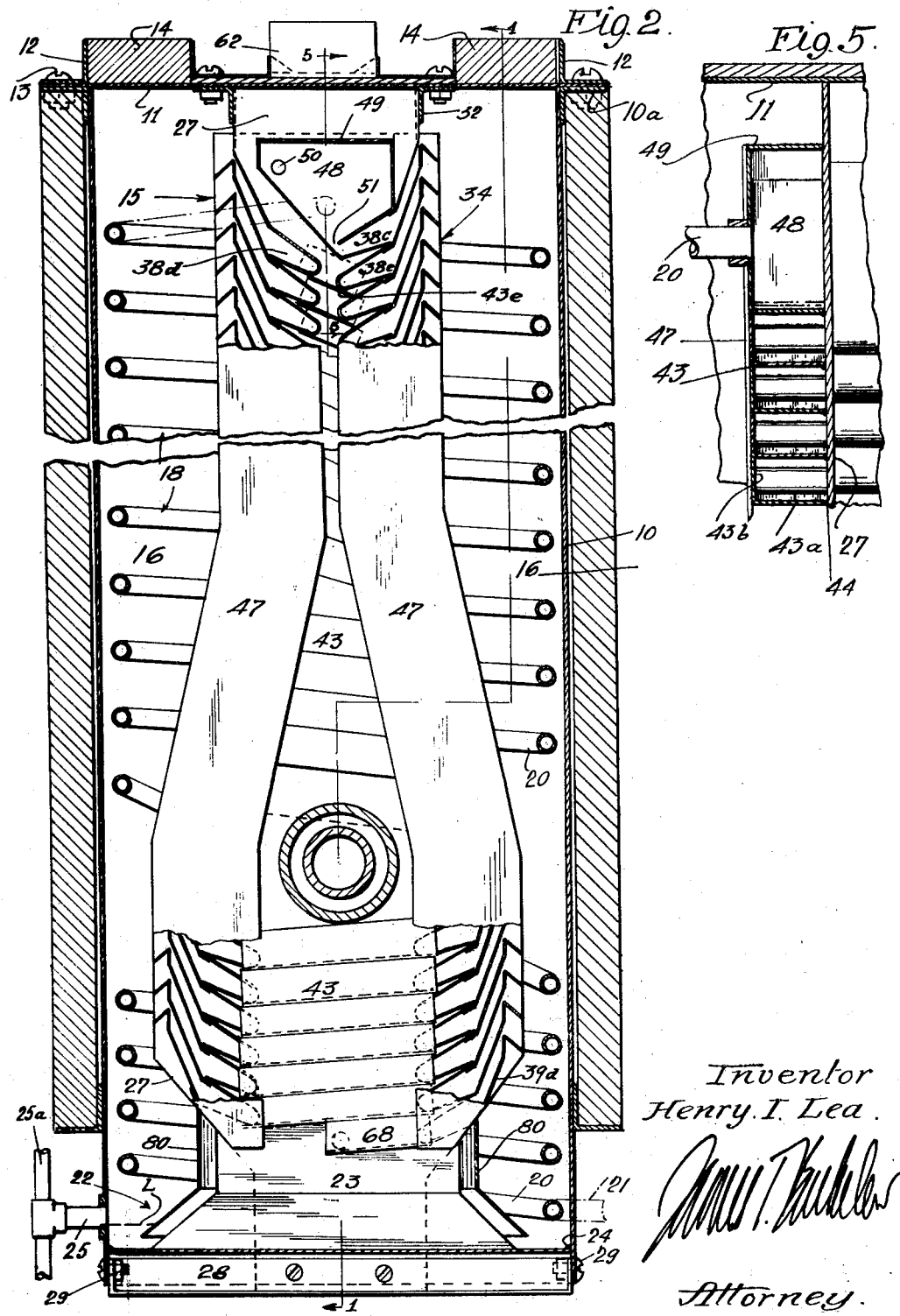
Fig. 2 is a transverse section on line 2—2 of Fig. 1, upper and lower portions of the evaporator structure being broken away to show the trough arrangement more clearly.

The preheated feed liquid which passes from the condenser to the upper end of the evaporator, is discharged into a separating chamber 48, see Figs. 2 and 5, formed by a shell 49 placed between supporting plate 27 and plates 47 closing the side troughs beyond plate 27. The condenser coil connects with chamber 48 as indicated in Fig. 5. Upon being discharged from the condenser into chamber 48, the preheated feed liquid is freed of all air and other gases which it may contain, the liberated gases passing through opening 50 into the interior gas chamber of the evaporator, hereinafter described, to be expelled from the still with the spent combustion gases. The liquid, freed of all gases, flows from chamber 48 through slot 51 in the inner side of trough 38c, and into that trough to start its downward spiral path of flow through the evaporator. The gases liberated in chamber 48 however, are prevented from following a similar course and from being liberated into the vapor spaces 16 and 17 surrounding the evaporator, by reason of slot 51 being located beneath the liquid level in trough 38c. There is thus formed a liquid seal at the point of communication between the separating chamber and trough 38c, which precludes any possibility of gases escaping from the chamber except through the vent opening 50, and which also precludes the possibility of vapors in spaces 16 and 17 escaping through vent 50 in the gas flue.

Figure 3:
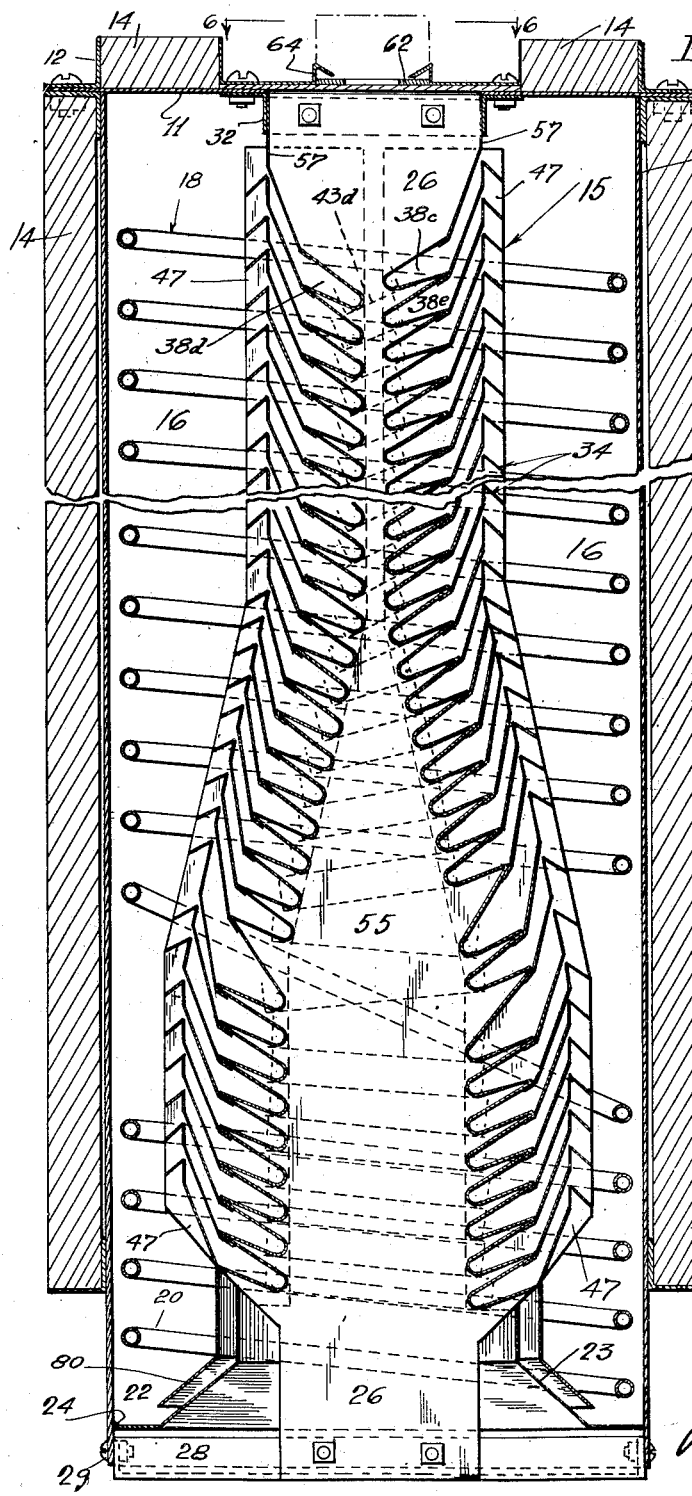
Fig. 3 is a transverse section on line 3—3 of Fig. 1.

Referring now to Fig. 3, the series of troughs are shown to enclose an interior chamber 55 communicating at its lower end with the air intake space 30 at the bottom of the shell 10, and at its upper end with a series of holes 56 in the cover plate 11. This interior chamber is enclosed from the vapor spaces 15 and 16 above the series of troughs, by metallic sheets 57, secured to the outer edges of vertical supporting plates 26 and 27, and to the angle member 32 which is fastened to the underside of the cover plate.

In the broad aspects of the invention, any suitable source of heat may be provided for vaporizing the liquid in its flow through the evaporator. I find, however, that heating and vaporization may be most efficiently accomplished by passing an upward stream of hot gases in contact with the inner surfaces of the troughs exposed to the interior chamber 55. In adopting this preferred means of heating, I may further mention that hot gases may be supplied to the chamber 55 in any suitable manner, either from an extraneous source, or by the combustion of fuel within the chamber.

Figure 6:
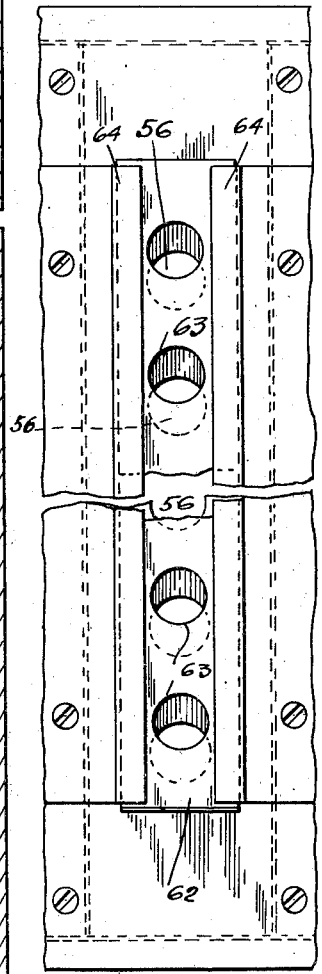
Fig. 6 is a fragmentary plan as indicated by line 6—6 of Fig. 3.

In Fig. 1, I show a burner nozzle 58 projecting into the chamber 55 at an intermediate vertical point therein, the nozzle being inserted through a tubular jacket 59 and an opening at 60 in plate 27. The nozzle has a connection 61 with a suitable fuel supply source and air-mixing device. The burner nozzle may first be removed from the still, lighted and then reinserted to the position shown. The hot combustion gases pass from the burner upwardly through that portion of chamber 55 thereabove and in intimate heat transferring contact with the series of side troughs, to finally pass from the still through openings 55 in the cover plate. The draft through the combustion chamber may be controlled by a sliding damper 62, see Fig. 6, having openings 63 adapted to register with the openings in the cover plate, the damper being confined in its sliding movement by the guide 64.

The condensate formed on the upper faces of the down turned baffles 39b, also on the condenser coils and on the inner walls and cover plate of shell 12, drains to the bottom of the still and is collected in a rectangular trough 22 formed by metallic plate 23 secured to the side and end walls of the shell as at 24. As will be seen in Fig. 1, the inner sides of the transverse end portions of the trough are located inwardly from the trough and closure plates 47, so that any condensate accumulating on these plates, will drain into the trough. The condensate, which consists of the distilled fraction of the feed liquid, is led off from the trough 23 through outlet line 25, see Fig. 2.

I preferably, although not necessarily, provide a rectangular liquid seal apron 80, the sides of which may conveniently be secured to the lower portions of vanes 39d extending upward from the bottom troughs. The ends of the rectangular sealing apron 80 may be attached, as shown in Fig. 1, to the lower portions of trough closure plates 47 as at 81. As seen in Fig. 2, the lower end of apron 80 projects below outlet 25 and below the lowest possible liquid level L that may be maintained in the trough 22. The apron thus serves to maintain a liquid seal between the vapor spaces 16 and 17 and the combustion chamber in the evaporator.

If at any time the percentage of evaporation within the still is so high that the raw water fed through the condenser will be inadequate to accomplish complete condensation of the vapors, this fact can be determined by connecting to the outlet pipe 25, a vertical open end nipple 25a through which uncondensed vapors may escape. Standing at its normal level in trough 22, the distillate will not rise to the top of the outlet opening, so that uncondensed vapors may pass out with the accumulated distillate.

In the operation of the still, cooled water enters the condensing coil and travels forward in a rectangular spiral path, and in its forward travel absorbs heat from the vapors being condensed around the coil until the water, upon reaching the upper end of the evaporator, approaches its boiling point. As the preheated liquid is discharged and caused to fall within the separating chamber 48, entrained air and other gases from foreign matters that may be present in the raw liquid, separate and pass through opening 50 into the stream of combustion gases rising within the flue. It is essential when water, for instance, is being distilled, that the air and gases in the liquid be removed prior to downward passage of the liquid over the evaporator. In the first place, in order that the distillate may be pure and free from contamination, the gaseous impurities must be removed. It is also necessary that for maximum efficiency in subsequent heating and vaporization of the liquid within the series of troughs, that air and other gases be eliminated, it being common knowledge that the presence of gas in a liquid being heated or between the liquid and a wall through which heat is being communicated to the liquid, very materially reduces the rate of heat transfer. Since in the present apparatus, gas-free liquid is passed into the troughs, it is assured that under no conditions will insulating films of gas be formed at the heating surfaces.

For reasons of economy, it is also essential that vapors from the evaporator be prevented from following the path of separated gases, into the gas flue. As previously explained, such escape of vapors is prevented by the presence of a hydraulic seal between the bottom outlet of the separating chamber and the uppermost evaporator channel.

Upon entering trough 38c, the raw liquid travels to the rear end of the trough, as viewed in Fig. 2, then flows through the inclined end channel 43d, see Fig. 3, into side trough 38d. The liquid then flows forwardly in trough 38d, as viewed in these figures, and through the inclined end trough 43e into side trough 38e, and so on down through the entire series of troughs, except as hereinafter explained.

It will be noted that the end troughs at the left, as viewed in Fig. 1, are interrupted by the burner opening, while at the opposite end of the evaporator, the end troughs continue the full height of the evaporator. The path of the liquid in flowing through the troughs opposite the burner is most clearly indicated by the arrows in Fig. 4. At the left side of the evaporator, the end troughs continue the full height of the evaporator. The path of the liquid in flowing through the troughs opposite the burner is most clearly indicated by the arrows in Fig. 4. At the left side of the evaporator, the liquid is flowing forwardly in trough 38f, then across the front end of the evaporator through inclined trough 43f into side trough 38g. The liquid then flows toward the rear into end trough 43g, and then comes forward through trough 38h. There being no end troughs at the forward end of the evaporator where burner casing 59 passes through, the forwardly flowing liquid in 38h is discharged at the front end of the trough directly into the side trough 38i below through tube 66 connecting the troughs. The liquid then reverses its flow in trough 38i and passes around to side trough 38j within which the liquid flows forward and then at the front end of the apparatus down through tube 67 into trough 38k. A similar subsequent downward path is travelled by the liquid, as indicated by the arrows, until the end trough 43k below the burner is reached, whereupon the normal path of flow as described with reference to the trough arrangement above the burner, is resumed but in reversed direction. The residue or unevaporated portion of the liquid finally passes into end trough 68, see Fig. 2, at the bottom of the evaporator, and is led off through pipe 69.

The flow of liquid through the channels is positive, and continues at a fairly high rate, this being true although the side channels are substantially level. It may be mentioned that the depth of the liquid in the side troughs is shallow, so that there is present in each of these troughs, what may best be described as a comparatively wide "ribbon" of liquid having large surface exposure and shallow depth. Because of the turbulence of boiling, rapid horizontal travel, and the thin, large-surface "ribbon" of liquid being heated, also the large area of thin copper wall in direct contact with the combustion gases and immediately surrounding the liquid being evaporated, extremely high heat transmission, thermal efficiency, and steam generating capacity is made possible. As previously mentioned, the shape of the troughs themselves further promote high efficiency by virtue of the angle of inclination of the bottoms of the side troughs. By virtue of the particular shape of the troughs, together with the attached outwardly extending baffle vanes, it is impossible for vesicles of the raw liquid to be thrown, even under conditions of violent boiling, from the troughs into the vapor space.

The liberated vapors, however, readily pass through the openings between adjacent vanes into the surrounding vapor space. Then, throughout vapor space 16—17 the vapors condense and give up to the feed liquid passing through the coils, their heat of condensation and a large part of the sensible heat of the liquid resulting from condensation. The condensate in passing downward over the condenser coil, meets the progressively lower temperatures of the feed liquid toward the bottom of the apparatus, and finally collects in the trough 22 at the bottom of the shell. From this trough, within which is submerged the coolest part of the condensing coil, the distilled liquid is discharged to storage through outlet 25.

No substantial amount of heat is transmitted to the liquid in the troughs below the burner, the result being that the liquid, in being maintained in a rapid rate of flow through these lower channels, and in a condition of thorough surface exposure, gives off vapors at the expense of sensible heat of the liquid. This results in a final cooling of the residue far below the boiling temperature of the liquid. The heat liberated to accomplish final cooling of the residue by vaporization, however, is retained in the system by reason of the transfer of heat from the vapors to the condenser coil as in the manner previously explained. Additional cooling of the residue occurs by reason of the air passing up through the combustion chamber to the burner, becoming preheated by contact with the channels carrying the hot waste liquid below the burner. Here again the heat taken from the residue in preheating the air, is retained within the system, since such heat supplemented with that resulting from combustion of the fuel, is transmitted to the liquid in the troughs being heated by the combustion gases.

A particularly important advantage had by the present type of evaporator, resides in its capacity for self-flushing. By reason of the liquid being maintained at a fairly rapid rate of flow through the channels, any sediment or solid precipitate from the liquid is swept along by the liquid stream and prevented from corroding or depositing on the walls of the troughs. Also, when it is desired to discontinue operations no special precautions are required to empty the still, since when the supply of feed liquid is discontinued, the evaporator will drain completely, and no subsequent flushing action becomes necessary.

I claim:

1. In apparatus of the character described, an evaporator comprising a vertically progressing series of horizontally extending, elongated and comparatively narrow troughs, means for passing liquid in downwardly flowing streams through said troughs, and means for supplying heat to a chamber surrounded by the inner walls of said troughs to heat and vaporize the liquid, said troughs extending along opposite sides and ends of said chamber.

2. In apparatus of the character described, an evaporator comprising a vertically progressing series of horizontally extending elongated and comparatively narrow troughs, means for passing liquid in a downwardly flowing stream through said troughs, and means for passing hot gases into a chamber surrounded by the inner walls of said troughs to heat and vaporize the liquid therein, said troughs extending along opposite sides of said chamber and the hot gases being maintained out of contact with vapors liberated from the troughs.

3. In apparatus of the character described, an evaporator comprising a vertically progressing series of horizontally extending and comparatively narrow troughs, the inner walls of which form spaced opposite walls of a heating chamber, means for passing liquid in a downwardly flowing stream through said troughs, troughs at opposite sides of said chamber being in end to end communication, and means for supplying heat to said chamber to heat and vaporize the liquid in the troughs.

4. In apparatus of the character described, an evaporator comprising vertically progressing series of troughs comprising elongated and comparatively narrow troughs extending along opposite sides of a heating chamber, means for passing liquid downwardly through said troughs, and means for supplying heat to said chamber to heat and vaporize the liquid in the troughs, the side walls of said troughs forming the heating chamber wall and the interiors of said troughs being closed from said chamber.

5. In apparatus of the character described, an evaporator comprising vertically progressing series of troughs comprising elongated and comparatively narrow troughs extending along opposite sides of a heating chamber, means for passing liquid downwardly through said troughs, and means for supplying hot gases to said chamber to heat and vaporize the liquid in the troughs, the side walls of said troughs forming the heating chamber wall and the interiors of said troughs being closed from said chamber.

6. In apparatus of the character described, an evaporator comprising a vertically progressing series of horizontally extending elongated and comparatively narrow troughs in substantially spiral arrangement, means for passing liquid in a downwardly flowing stream through said troughs, and means for supplying heat to a chamber surrounded by said troughs to heat and vaporize the liquid, the side walls of said troughs forming the wall of said chamber, vapors being liberated outwardly from the troughs and said chamber being closed from communication with the interior of the troughs.

7. In apparatus of the character described, an evaporator comprising a vertically progressing series of elongated and comparatively narrow troughs in substantially spiral arrangement surrounding a heating chamber, the side walls of said troughs forming the wall of said chamber, means for passing liquid in a downwardly flowing stream through said troughs, and means for supplying hot gases to said chamber to heat and vaporize the liquid in said troughs, said chamber being closed from communication with the interiors of the troughs.

8. In apparatus of the character described, an evaporator comprising a vertically progressing series of horizontally extending elongated and comparatively narrow troughs, one of said troughs having a top wall overlying the bottom of that trough and connected to the bottom of the trough next above, means for passing liquid in a downwardly flowing stream through said troughs, and means for heating and vaporizing the liquid, the vapors being liberated from the troughs.

9. In apparatus of the character described, an evaporator comprising a vertically progressing series of horizontally extending elongated and comparatively narrow troughs, one of said troughs having a top wall overlying the bottom of that trough and connected to the bottom of the trough next above, there being vapor passing openings leading laterally from said troughs.

10. In apparatus of the character described, an evaporator comprising vertically progressing series of elongated and comparatively narrow troughs at opposite sides of a heating chamber, one of said troughs having a top wall overlying the bottom of that trough and connected to the bottom of the trough next above, and the bottom of the last mentioned trough being directly exposed to said heating chamber, means for passing liquid downwardly through said troughs, and means for supplying heat to said chamber to heat and vaporize the liquid in the troughs.

11. In apparatus of the character described, an evaporator comprising spaced vertically progressing series of elongated and comparatively narrow troughs extending along opposite sides of a heating chamber, said troughs having top and bottom walls extending laterally away from said chamber and said walls forming laterally opening vapor passing spaces, means for passing liquid downwardly through said troughs, and means for supplying heat to said chamber to heat and vaporize the liquid in the troughs.

12. In apparatus of the character described, an evaporator comprising spaced vertically progressing series of elongated and comparatively narrow troughs extending along opposite sides of a heating chamber, inclined troughs at the end of said chamber for conveying liquid from one to the other of said side troughs, means for passing liquid downwardly through all of said troughs, and means for supplying heat to said chamber to heat and vaporize the liquid in the troughs.

13. In apparatus of the character described, an evaporator comprising spaced vertically progressing series of substantially level elongated and comparatively narrow troughs extending along opposite sides of a heating chamber, inclined troughs at the end of said chamber for conveying liquid from one to the other of said side troughs, means for passing liquid downwardly through all of said troughs, and means for supplying heat to said chamber to heat and vaporize the liquid in the troughs.

14. In apparatus of the character described, an evaporator comprising a vertically progressing series of elongated and comparatively narrow horizontally extending troughs, means forming a chamber communicating with one of the upper troughs, means for feeding liquid to said chamber, the liquid thence passing in a downwardly flowing stream through said troughs, means for removing gases separating from the liquid in said chamber and for preventing the removal with such gases of vapors generated in said troughs, and means for heating and vaporizing the liquid in said troughs.

15. In apparatus of the character described, an evaporator comprising a vertically progressing series of horizontally extending troughs, means forming a chamber communicating with one of the upper troughs, means for feeding liquid to said chamber, the liquid thence passing in a downwardly flowing stream through said troughs, means for passing a stream of hot gases in contact with said troughs to heat and vaporize the liquid therein, and means for venting gases separating from the liquid in said chamber into said hot gas stream.

16. In apparatus of the character described, an evaporator comprising a vertically progressing series of horizontally extending troughs, means forming a chamber communicating with one of the upper troughs, means for feeding liquid to said chamber, the liquid thence passing in a downwardly flowing stream through said troughs, a wall enclosing said troughs and forming a vapor space therebetween, means preventing the flow of gases from said chamber into said vapor space and the flow of vapor from said space into the chamber, and means for heating and vaporizing the liquid in said troughs.

17. In apparatus of the character described, an evaporator comprising spaced vertically progressing series of elongated and comparatively narrow troughs at opposite sides of a heating chamber, vertically extending supports at the ends of said troughs, conduits interconnecting said troughs at their ends, means for passing liquid downwardly through the troughs and conduits, and means for supplying hot gases to said chamber to heat and vaporize the liquid in said troughs.

18. In apparatus of the character described, an evaporator comprising spaced vertically progressing series of elongated and comparatively narrow troughs at opposite sides of a heating chamber, vertically extending supports at the ends of said troughs, inclined conduits interconnecting said troughs at their ends and beyond said supports, means for passing liquid downwardly through the troughs and conduits, and means for supplying hot gases to said chamber to heat and vaporize the liquid in said troughs.

19. Apparatus of the character described comprising, a liquid carrying condenser immediately surrounding a vapor chamber, an evaporator in said chamber, said evaporator comprising spaced vertically progressing series of horizontally extending, elongated and comparatively narrow troughs at opposite sides of a heating chamber, means for directing preheated liquid from the condenser to said evaporator whereby the liquid is caused to flow downwardly through the troughs, and means for supplying heat to said chamber to heat and vaporize the liquid in the troughs, vapor being liberated from the troughs and condensing on said condenser.

20. Apparatus of the character described comprising, a liquid carrying condenser immediately surrounding a vapor chamber, an evaporator in said chamber, said evaporator comprising a vertically progressing series of horizontally extending troughs in substantially spiral arrangement, vertically adjacent troughs being in end to end continuation, means for directing preheated liquid from the condenser to said evaporator whereby the liquid is caused to flow downwardly through the troughs, and means for heating and vaporizing the liquid in the troughs, vapor being liberated from the troughs and condensing on said condenser.

21. Apparatus of the character described comprising, a liquid carrying condenser immediately surrounding a vapor chamber, an evaporator in said chamber, said evaporator comprising a vertically progressing series of horizontally extending, elongated and comparatively narrow troughs, the side walls of said troughs forming a closed wall of a vertically extending heating chamber and the bottoms of the troughs being exposed to said chamber, means for directing preheated liquid from the condenser to said evaporator whereby the liquid is caused to flow downwardly through the troughs, and means for passing hot gases into said chamber in contact with the bottoms of the troughs to heat and vaporize the liquid therein, vapor being liberated from the troughs and condensing on said condenser.

22. Apparatus of the character described comprising, a liquid carrying condenser immediately surrounding a vapor chamber, an evaporator in said chamber, said evaporator comprising a vertically progressing series of horizontally extending troughs in substantially spiral arrangement surrounding a heating space, vertically adjacent troughs being in end to end continuation, and the bottoms of the troughs being exposed to said space, means for directing preheated liquid from the condenser to said evaporator whereby the liquid is caused to flow downwardly through the troughs, and means for passing hot gases into said space in contact with the bottoms of the troughs to heat and vaporize the liquid therein, vapor being liberated from the troughs and condensing on said condenser.

23. In a distillation apparatus, a structure defining an elongated vapor space, an evaporator within said structure and adjacent said vapor space, said evaporator comprising a vertically progressing series of elongated and comparatively narrow troughs, each of said troughs having a top wall overlying its bottom wall and connected to the bottom of the trough next above, a condenser included within said structure and having a heat transfer wall in direct exposure to vapors in said vapor space, means for feeding liquid through said condenser wherein the liquid is preheated, means for conducting the preheated liquid from said condenser over said evaporator, the liquid being vaporized in passing over the evaporator, and the vapors being liberated into said vapor space and condensed on the wall of said condenser, means for drawing off the unvaporized residue from said evaporator, and means for separately drawing off the condensate.

24. In a distillation apparatus, a structure defining an elongated vapor space, an evaporator within said structure and adjacent said vapor space, said evaporator comprising a series of troughs in substantially spiral arrangement, vertically adjacent troughs being in end to end continuation, a condenser included within said structure and having a heat transfer wall in direct exposure to vapors in said vapor space, means for feeding liquid through said condenser wherein the liquid is preheated, means for conducting the preheated liquid from said condenser over said evaporator, the liquid being vaporized in passing over the evaporator, and the vapors being liberated into said vapor space and condensed on the wall of said condenser, means for drawing off the unvaporized residue from said evaporator, and means for separately drawing off the condensate.

25. In a distillation apparatus, a structure defining an elongated vapor space, an evaporator within said structure and adjacent said vapor space, said evaporator comprising an elongated and comparatively narrow trough for conducting liquid in an elongated horizontally extending and shallow stream, a condenser included within said structure, and having a heat transfer wall in direct exposure to vapors in said vapor space, means for feeding liquid through said condenser wherein the liquid is preheated, means for conducting the preheated liquid from said condenser over said evaporator, the liquid being vaporized in passing over the evaporator, and the vapors being liberated into said vapor space and condensed on the wall of said condenser, and means for supplying heat, other than the heat contained in said vapors, directly to the lower wall of said trough.

26. In a distillation apparatus, a structure defining an elongated vapor space, an evaporator within said structure and adjacent said vapor space, said evaporator comprising a substantially spirally shaped conduit for conducting liquid in a downwardly flowing substantially spiral and shallow stream, a condenser included within said structure and having a heat transfer wall in direct exposure to vapors in said vapor space, means for feeding liquid through said condenser wherein the liquid is preheated, means for conducting the preheated liquid from said condenser over said evaporator, the liquid being vaporized in passing over the evaporator, and the vapors being liberated into said vapor space and condensed on the wall of said condenser, and means for supplying heat to the bottom of said stream and across substantially its entire width.

HENRY I. LEA.